(12) United States Patent
Zhang et al.

(10) Patent No.: US 8,067,109 B2
(45) Date of Patent: Nov. 29, 2011

(54) BATTERY HOLDER

(75) Inventors: George(Huanyi) Zhang, Irvine, CA (US); De-Jin Chen, ShenZhen (CN)

(73) Assignee: Hon Hai Precision Inc. Co., Ltd., New Taipei (TW)

( * ) Notice: Subject to any disclaimer, the term of this patent is extended or adjusted under 35 U.S.C. 154(b) by 1027 days.

(21) Appl. No.: 11/999,435

(22) Filed: Dec. 5, 2007

(65) Prior Publication Data

US 2009/0148757 A1    Jun. 11, 2009

(51) Int. Cl.
*H01M 2/10* (2006.01)
*H01R 3/00* (2006.01)

(52) U.S. Cl. ........................ 429/100; 439/500

(58) Field of Classification Search ............ 429/96, 429/100; 439/500, 627, 862
See application file for complete search history.

(56) References Cited

U.S. PATENT DOCUMENTS

| 6,790,545 B2 * | 9/2004 | Wu | 429/1 |
| 6,844,107 B2 | 1/2005 | Alps | |
| 2003/0124902 A1 * | 7/2003 | Wu | 439/500 |

FOREIGN PATENT DOCUMENTS

CN    2710198    7/2005

* cited by examiner

*Primary Examiner* — Barbara Gilliam
*Assistant Examiner* — Maria J Laios
(74) *Attorney, Agent, or Firm* — Wei Te Chung; Andrew C. Cheng; Ming Chieh Chang (57) ABSTRACT

A battery holder for a button-type battery (1) includes a holder body having a base wall (100) thereof for receiving the battery, and positive and negative terminals (20, 30) assembled to the holder body. The negative terminal has short and long spring elements (311, 315) defining first and second supporting point (311A, 315B) respectively, such that in an initial released position, the button-type battery is lifted up by the first and second supporting points bearing against the base wall, and in a fully released position, that battery is lifted by the second supporting point against the base wall with the first supporting point leaving away from the base wall. The above spring elements provides two-stage elastic forces, for ease of the user to release the battery from the battery holder.

15 Claims, 6 Drawing Sheets

BATTERY HOLDER

BACKGROUND OF THE INVENTION

1. Field of the Invention

The present invention relates to the art of electrical connectors, and more particularly to a battery holder for a button-type battery.

2. Description of the Related Art

The battery holder for a button-type battery is required to have electrical contacts firmly hold the button-type battery in good electrical contact. In additional to that issue, easy release of the button-type battery from the battery holder may also be required for the user to easily take the battery out of the battery holder. U.S. Pat. No. 6,844,107 discloses a related battery holder having a negative terminal defining long spring elements adapted to lift the button-type battery up during the release of the battery from the battery holder. This configuration of long spring elements will not provide elastic force sufficient to cause the battery left away from the battery holder. The negative terminal is expected to have suitable spring units designed to easily lift the battery up from the battery holder with less external forces exerted on the spring units, which provides better elasticity thereof. To achieve the easy release of the battery, a positive terminal having two spaced vertical pieces linked by a middle folded spring element is supposed to work in conjunction with the negative terminal for providing variable space by laterally elastically pressing one vertical piece towards the other. CN Pat. Issue No. 2710198 discloses a related battery holder having such a positive terminal including two spaced vertical pieces linked by a single middle folded spring element, with one vertical piece secured onto the battery holder housing while leaving the other one free therefrom. A problem with the above battery holder while having no battery equipped therewith is that the positive terminal may form a short circuit to the negative terminal. That is because the free vertical piece of the negative terminal may be easily caused to lean towards the positive terminal by an unexpectedly external lateral force applied to the free vertical piece. This is undesirable in electrical contact of the battery holder.

Therefore, there is a need to provide a coaxial electrical connector to resolve the above-mentioned problem.

SUMMARY OF THE INVENTION

A battery holder for a button-type battery having a bottom surface and a side surface thereof, according to an embodiment of the present invention, includes a holder body having a base wall and a receiving space above the base wall for receiving the button-type battery, and positive and negative terminals assembled to the holder body. The holder body defines right and left regions around the base wall for receipt of positive and negative terminals, respectively. The positive terminal defines a vertical piece member adapted to abut against the side surface of the button-type battery. The negative terminal has a battery engaging section extending adjacent the right region for engaging the bottom surface of the button-type battery, a board connecting section on the left region, and short and long spring elements extending from the battery engaging section towards the board connecting section. The short spring element has a first supporting point proximate to the battery engaging section, and the long spring element has a second supporting point disposed adjacent to the board connecting section, such that when the button-type battery is released at a first position from the battery holder, part of the button-type battery, engaged by the battery engaging section of the negative terminal, is lifted up by the first and second supporting points bearing against the base wall, and when the button-type battery is released at a second position, that part of the button-type battery is lifted by the second supporting point against the base wall while leaving the first supporting point away from the base wall. The above spring elements are configured to provide two-stage elastic forces corresponding to two different released position of the battery taking out of the battery holder. This configuration of different spring elements will ease the user to lift up the battery from the battery holder due to having two-stage different elastic forces offered to cause the battery left away from the battery holder during the release of the battery from the battery holder.

A battery holder for a button-type battery having a bottom surface and a side surface thereof, according to an embodiment of the present invention, includes a holder body having a base wall and a receiving space above the base wall for receiving the button-type battery, and positive and negative terminals assembled to the holder body. The holder body defines right and left regions around the base wall for receipt of positive and negative terminals, respectively. The negative terminal has a battery engaging section extending adjacent the right region for engaging the bottom surface of the button-type battery, a board connecting section on the left region, and a spring member extending from the battery engaging section towards the board connecting section such that when the button-type battery is released from the battery holder, part of the button-type battery, engaged by the battery engaging section of the negative terminal, is lifted by that spring member. The positive terminal has opposite spaced first and second vertical pieces linked by a middle folded spring element therebetween, with the first vertical piece secured onto the holder body. Distance control means, associated said second vertical piece with said first vertical piece, is configured to enable said second vertical piece to be movable relative to the first vertical piece along a predefined direction within a predetermined distance. The second vertical piece is urged to be moved away from the side surface of the button-type battery towards the first vertical pieces so as to release the button-type battery from the battery holder. This configuration of distance control means will prevent a short circuit between the negative terminal and the positive terminal, even if an unexpected lateral external force may urge the second vertical piece to be titled towards the negative terminal. That is because the movement of the second vertical piece relative to the first vertical piece is limited by the distance control means to be within a predetermined distance along a single predefined direction so as not to cause the second vertical piece to be tilted in contact with the negative terminal, which results in a short circuit between the positive terminal and the negative terminal.

Other features and advantages of the present invention will become more apparent to those skilled in the art upon examination of the following drawings and detailed description of preferred embodiments, in which:

DETAILED DESCRIPTION OF PREFERRED EMBODIMENT

Referring to FIGS. 1 to 6, a battery holder 10 for a button-type battery 1 is shown according to an embodiment of the present invention. The button-type battery 1 is disc-like and has a circular side 1a and a pair of opposite flat surfaces 1b and 1c. The circular side 1a and the upper flat surface 1b are integrated, function as a positive electrode, while the bottom flat surface 1c functions as a negative electrode. The battery holder 10 is designed to include a holder body having a base wall 100, and a receiving space above the base wall 100, which is formed by peripheral walls for receiving the button-type battery 1. The holder body defines right and left regions, having through-holes thereof, around the base wall 100 for receipt of positive and negative terminals 20 and 30, respectively.

Figure 1:
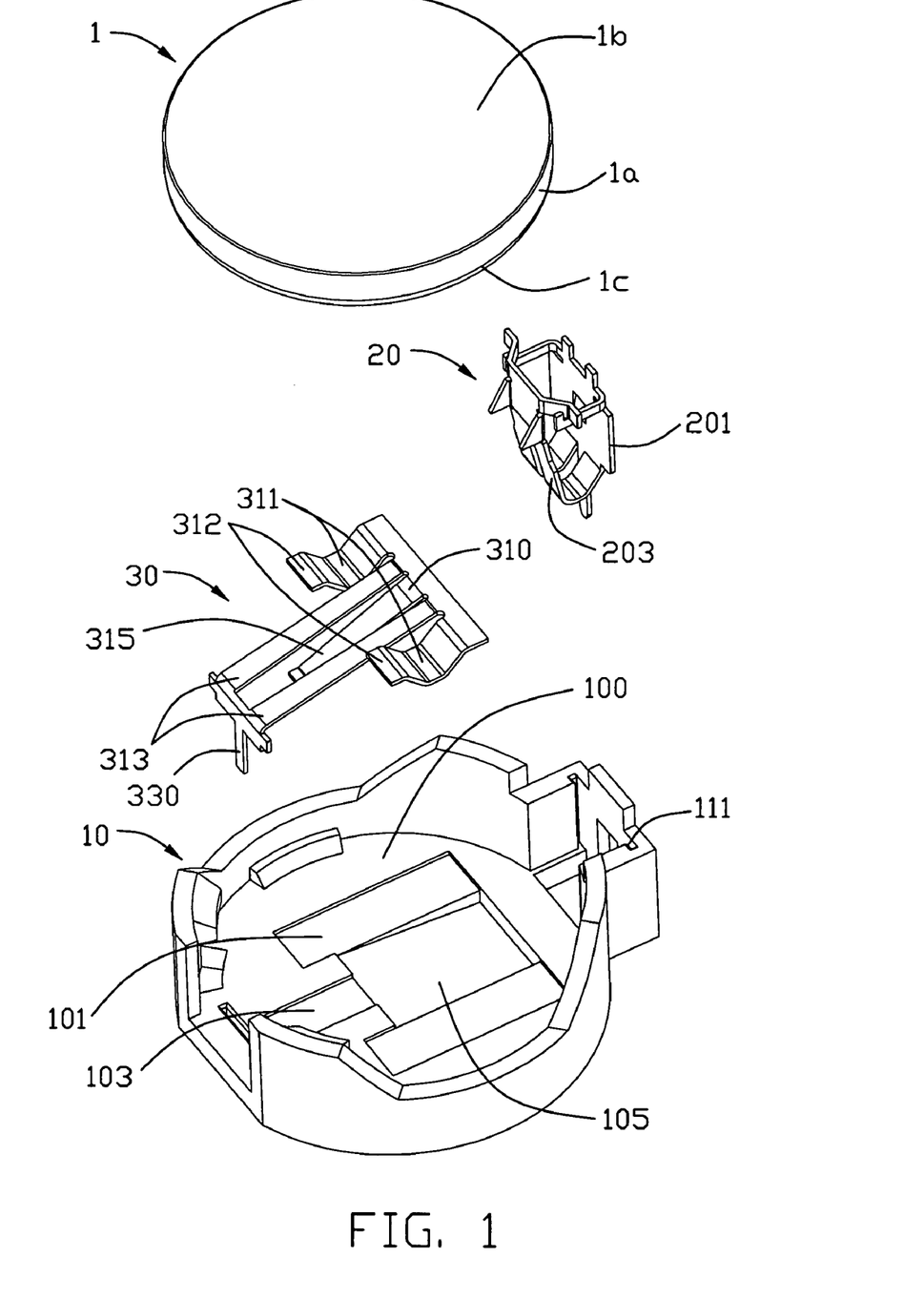
FIG. 1 is an exposed, perspective view of a battery holder used for a button-type battery according to an embodiment of the present invention.
Figure 2:
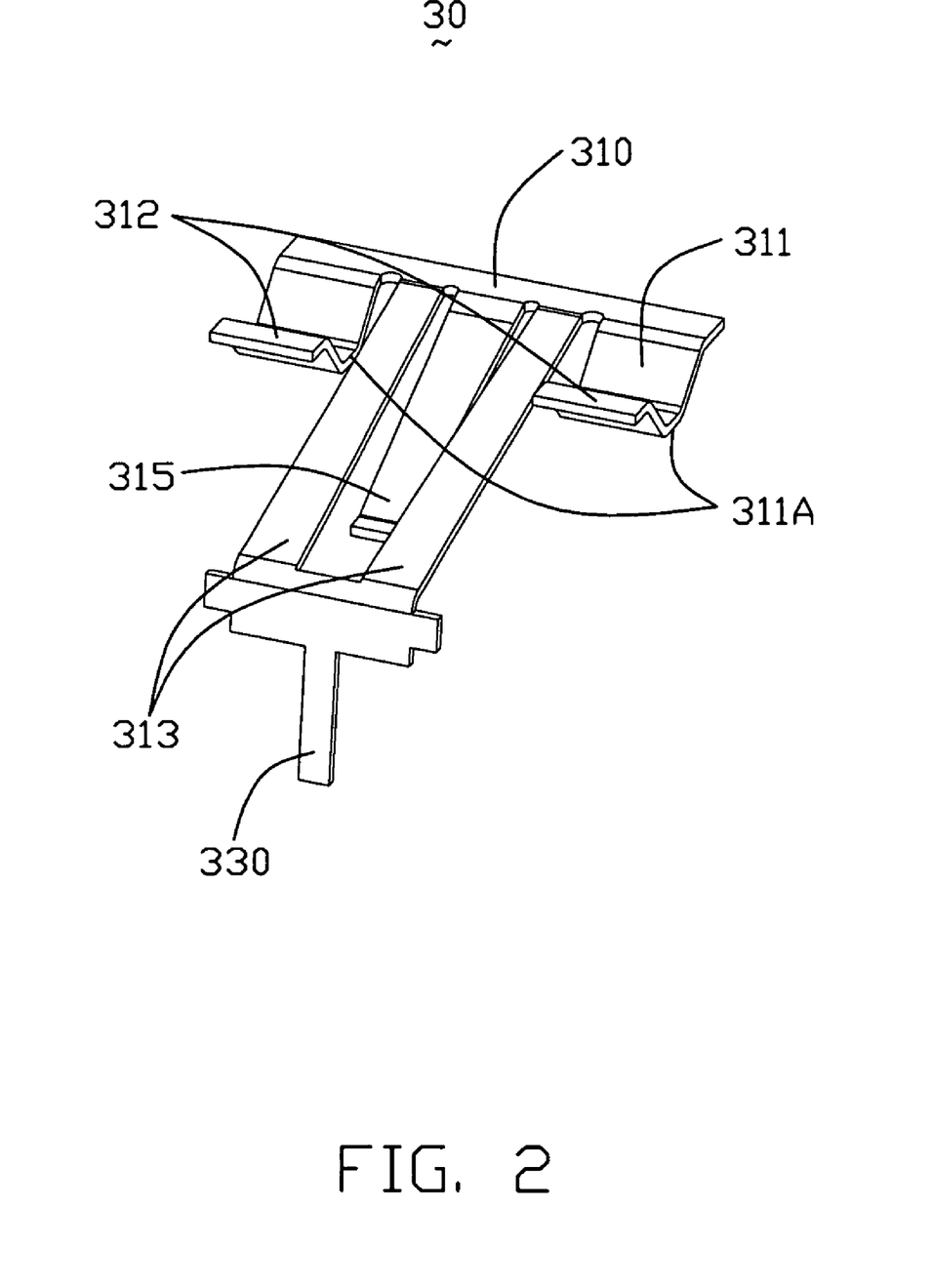
FIG. 2 is a perspective view of a negative terminal included within the battery holder of FIG. 1.

Referring particularly to FIGS. 1 and 2, the negative terminal 30 is shown to have an elongated battery engaging section 310 extending adjacent the right region and adapted for engaging the bottom flat surface 1c of the button-type battery 1, and a board connecting section 330, in form of a longitudinally-extending connecting leg, disposed on the left region. A set of spring members, including two shortest free spring elements 311, and two longest spring elements 313 with a middle longer free spring element 315 disposed therebetween, are configured to extend from the battery engaging section 310 towards the board connecting section 330 to help in elastically lifting the battery 1 up from the battery holder when releasing the button-type battery 1 from the battery holder, as well as providing more electrical contact regions for engagement with the negative-electrode bottom surface 1c of the button-type battery 1 to be loaded into the battery holder. The shortest spring elements 311 are positioned at opposite sides of the remaining three long spring elements 311 and 313. More specifically, ends of the two longest spring elements 311 and 313 integrally extend from the battery engaging section 310 to the board connecting section 330 so as to form a united configuration, while having the remaining spring elements, including the two shortest spring elements 311 and the middle longer spring element 315, free at one ends thereof. Each of the shortest spring elements 311, from a side view thereof, is of U-shaped configuration, which defines a first supporting point 311A at the bottom thereof and proximate to the battery engaging section 330 of the negative terminal 30 so as to lift the battery 1 up the battery holder mainly by that first supporting point 311A, to be later described, with an additional contact region 312 at the free end of the shortest spring element 311. The shortest spring element 311 may be designed to have a different width at the free end thereof, which is determined by the electrical contact requirement depending on various applications. The middle longer spring element 315 and the two longest spring element 313 is configured to have elongated contact regions extending in a direction from the battery engaging section 310 towards the board connecting section 330. It should be noted that a great number of the spring elements is to increase the electrical contact regions for electrically engaging the negative-electrode bottom surface 1c of the button-type battery 1, which is to be loaded into the battery holder. The middle longer spring element 315 also defines a second supporting point 315B, adjacent to the board connecting section 330 of the negative terminal 30, to assist in lifting the battery 1 up from the battery holder at a full released position of the button-type battery 1, to be later described. In addition, the base wall 100 of the battery holder is configured to have stepped slots, including slots 101, 103 and 105 of different depths, adapted for receiving the respective spring elements 311, 313 and 315. That is, the two shortest spring elements 311 are to be set into two side deep slots 101, while the middle longer spring element 315 and the two longest spring elements 313 are to be embedded within inclined deeper slots 105 and 103 much deeper than the side slots 101. This slot configuration will assist in help the above different-length spring elements to provide efficient elastic forces for the button-type battery 1 during release of the battery 1.

Figure 3:
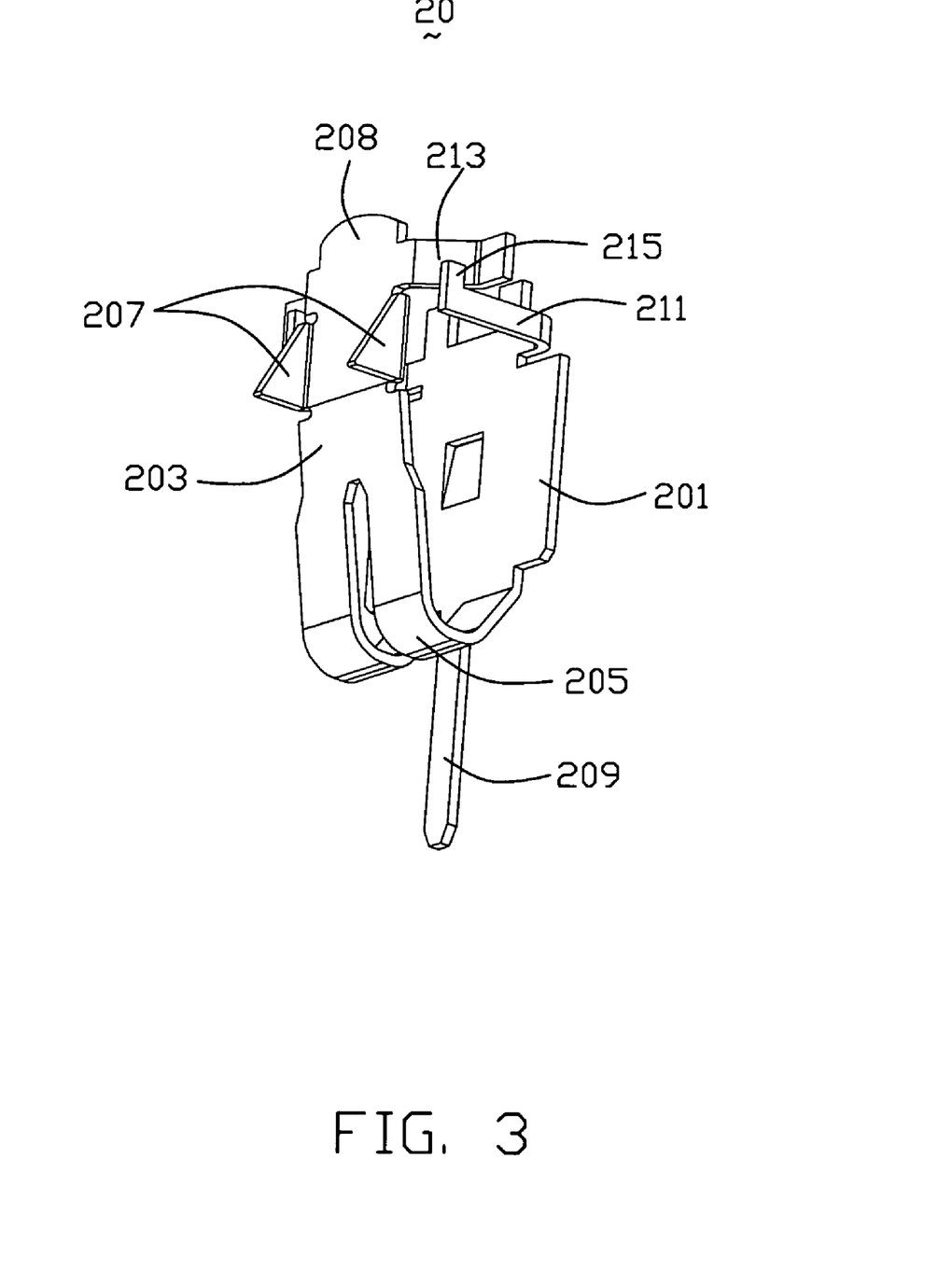
FIG. 3 is a perspective view of a positive terminal included within the battery holder of FIG. 1.

Referring particularly to FIGS. 1 and 3, the positive terminal 20 is shown to have opposite spaced first and second vertical pieces 201 and 203 linked by a middle folded spring element 205 therebetween, with the first vertical piece 201 secured onto the holder body by a lateral slot 111 defined on a side wall while leaving the second vertical piece 203 free therefrom so as to permit the second vertical piece 203 to be movable relative to the first vertical piece 201 by a lateral external force. Distance control means, including first arm elements 211 attached to the first vertical piece 201 and second arm elements 213 attached to the second vertical piece 203, is arranged between the first vertical piece 201 and the second vertical piece 203 to lead the first vertical piece 201 to be moved relative to the first vertical piece 201 along a pre-defined direction within a predetermined distance. More specifically, the first vertical piece 201 includes a pair of first arms 211 attached to opposite sides thereof and adapted to extend from the first vertical piece 201 towards the second vertical piece 203, with a stop 215 attached to a free end of each first arm 211. The second vertical piece 203 includes a pair of second arms 213, in correspondence with the first arms 211, attached to opposite sides of the second vertical piece 203, and adapted to extend from the second vertical piece 203. This configuration of distance control means will prevent a short circuit between the negative terminal 30 and the positive terminal 20, even if an unexpected lateral external force may urge the second vertical piece 203 to be titled towards the negative terminal 30. That is because the movement of the second vertical piece 203 relative to the first vertical piece 201 is limited by the distance control means to be within a predetermined distance along a single predefined direction so as not to cause the second vertical piece 203 to be tilted in contact with the negative terminal 30, which results in a short circuit between the positive terminal 20 and the negative terminal 30. The positive terminal 20 further include hooks 207 attached thereto, which are adapted to electrically engage the positive-electrode bottom surface 1c of the button-type battery 1. Additionally, in a preferred embodiment, the positive terminal 20 further includes an operation handle 208 on the second vertical piece 203 for the user easy to drive the second vertical piece 203 to be moved relative to the first vertical piece 201.

In assembly, the positive terminal 20 is secured onto the holder body by the first vertical piece 201 received within the lateral slot 111 of the side wall of the holder body, and a positive connecting leg 209 on the left region to extend through the through-hole of the base wall 100. The negative terminal 30 is assembled to the holder body by its connecting leg 330 on the right region to extend through an aperture of the base wall 100, and the respective spring elements 311, 313 and 315 embedded within the stepped slots 101, 103 and 105 on the base wall 100.

Figure 4:
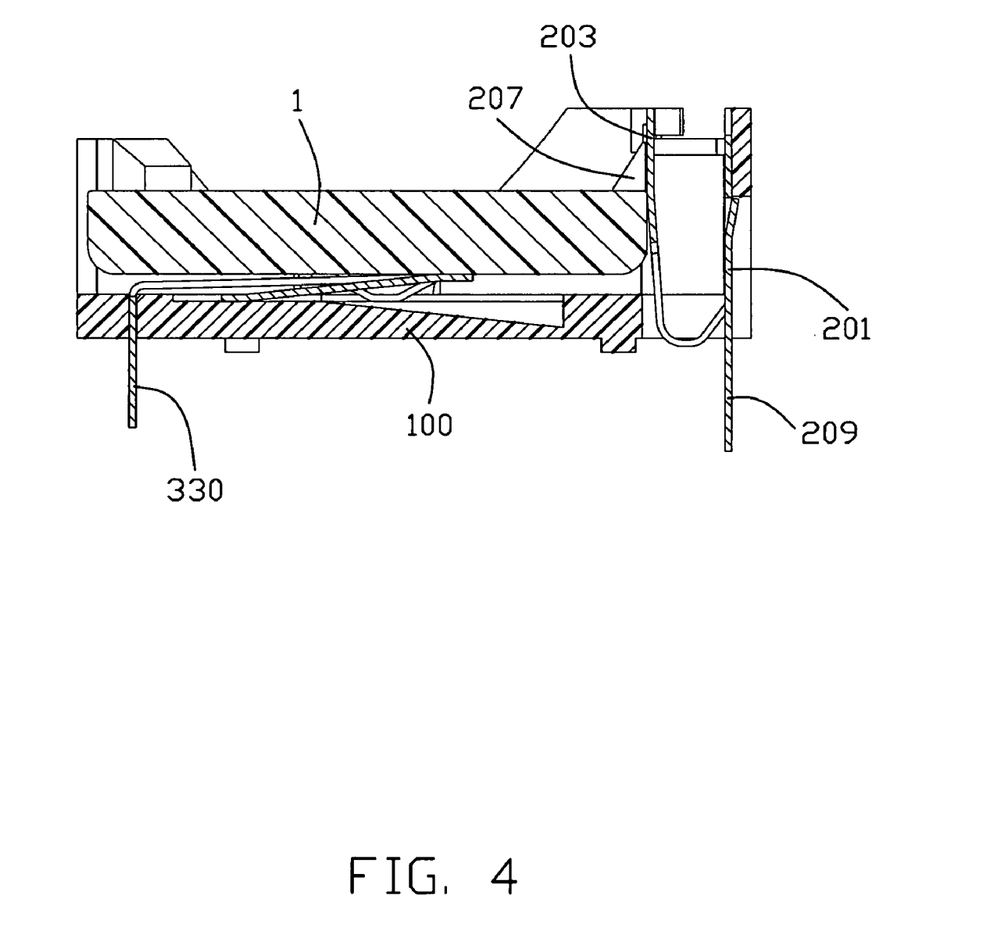
FIG. 4 is a cross-sectional view showing an assembled battery holder of FIG. 1 to be held at a loaded position.
Figure 5:
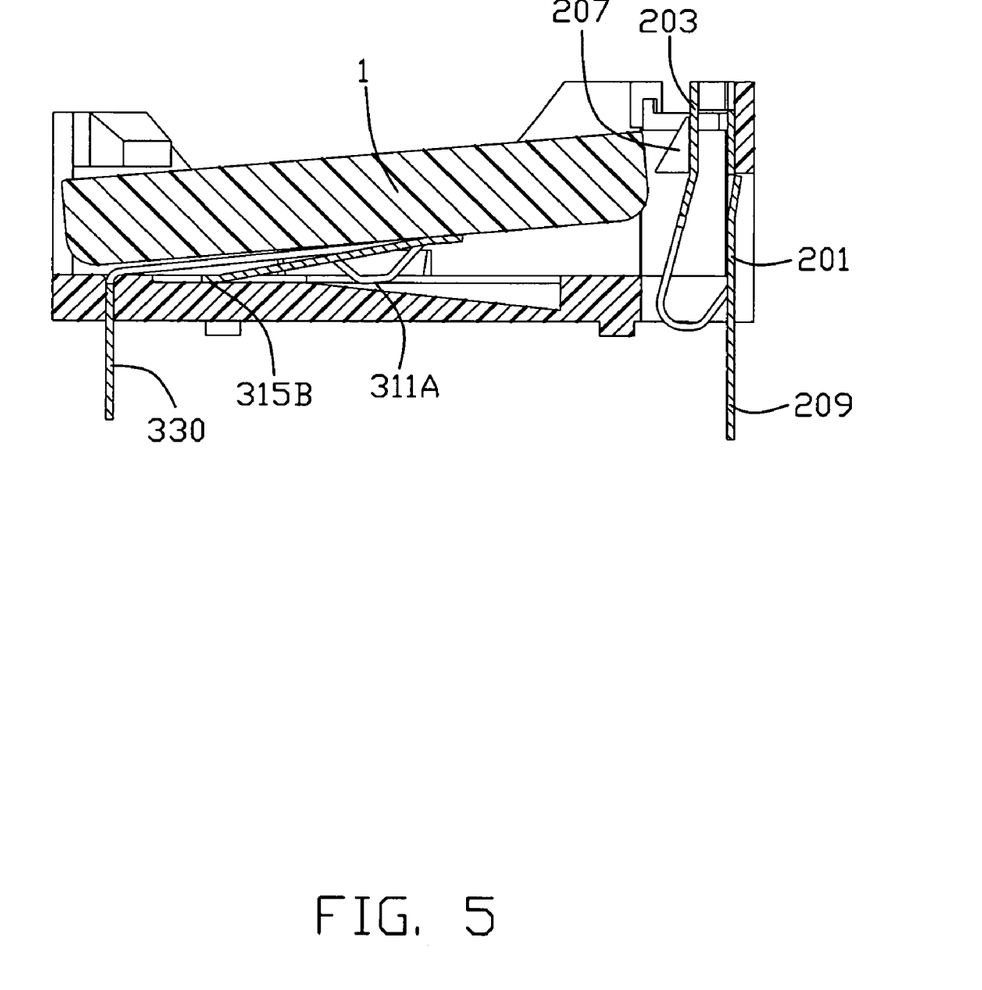
FIG. 5 is a cross-sectional view showing an assembled battery holder of FIG. 1 to be at an initial released position.
Figure 6:
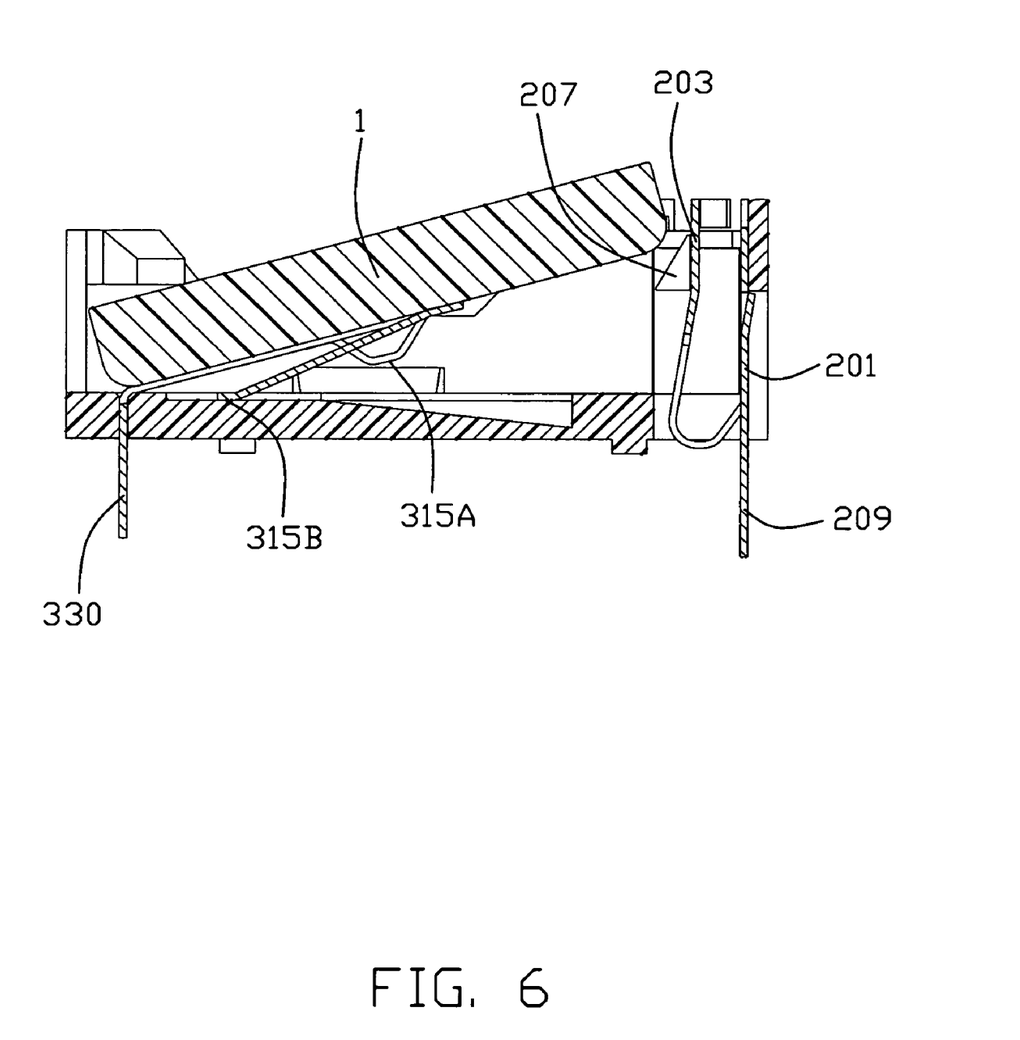
FIG. 6 is a cross-sectional view showing an assembled battery holder of FIG. 1 to be at a full released position.

In use, as shown in FIG. 3, in a loaded position, the second vertical piece 203 of the positive terminal 20 is pressed to abut against the positive-electrode side surface 1a of the button-type battery 1, with the hooks 207 enagagable with the top surface 1b of the battery 1, thereby forming a positive-electrode electrical connection to the battery 1. At the same time, all of the spring elements 311, 313 and 315 are pressed to have their contact regions to be enagagable with the negative-electrode bottom surface 1c of the battery 1, forming a negative-electrode electrical connection to the battery 1. As shown in FIG. 4, at an initial released position of the battery 1 taking out of the battery holder, the second vertical piece 203 is driven by an external lateral force, which may be exerted on the operation handle 208, to cause the second vertical piece 203 to be moved towards or close to the first vertical piece 201 so as to have the second vertical piece 203 spaced away from the side surface 1a of the button-type battery 1. In this state, part of the button-type battery 1, engaged by the battery engaging section 310 of the negative terminal 30, is lifted up by the first and second supporting points 311A and 315B bearing against the base wall 100 of the battery holder. As we known, in the initial released position, a much bigger elastic force is required to lift the battery 1 up from the battery holder, while in a later full released position, a little elastic force is to lift up the battery 1. Thus, the additional shortest spring element 311 having the first supporting point 311A thereof is capable of providing a bigger elastic force at the initial released position as compared with the later full released position. In the full released position taking the battery 1 out of the battery holder, that part of the button-type battery 1 is further lifted up by the second supporting point 315B against the base wall 100 while leaving the first supporting point 311 A spaced away from the base wall 100. Note that, in this embodiment, projection of the second supporting point 315B on the base wall 100 may be located different from that of the board connecting section 330. The above spring elements 311, 313 and 315 are configured to provide two-stage elastic forces corresponding to two different released position of the battery 1 taking out of the battery holder, with one stage elastic force offered by all of the spring elements 311, 313 and 315, and the other stage elastic force by these spring elements not including the shortest spring elements 311. This configuration of different spring elements 311, 313 and 315 will ease the user to lift up the battery 1 from the battery holder due to having two-stage different elastic forces offered to cause the battery 1 left away from the battery holder during the release of the battery 1 from the battery holder.

While the present invention has been described with reference to preferred embodiments, the description of the invention is illustrative and is not to be construed as limiting the invention. Various modifications to the present invention can be made to preferred embodiments by those skilled in the art without departing from the true spirit and scope of the invention as defined by the appended claims.

What is claimed is:

1. A battery holder for a button battery having a bottom surface and a side surface thereof, the battery holder comprising:
    a holder body having a base wall and a receiving space above the base wall for receiving the button battery, the holder body defining right and left regions around the base wall for receipt of positive and negative terminals, respectively;
    the positive terminal defining a vertical piece member adapted to abut against the side surface of the button battery;
    the negative terminal having a battery engaging section extending adjacent the right region for engaging the bottom surface of the button battery, a board connecting section on the left region, short and long spring elements extending from said battery engaging section towards the board connecting section; and wherein
    said short spring element having a first supporting point proximate to said battery engaging section and said long spring element having a second supporting point disposed adjacent to said board connecting section, such that when the button battery is released at a first position from the battery holder, part of the button battery, engaged by said battery engaging section of the negative terminal, is lifted up by said first and second supporting points bearing against the base wall, and when the button battery is released at a second position, said part of the button battery is lifted by said second supporting point against the base wall while leaving said first supporting point away from the base wall,
    wherein said vertical piece member includes opposite spaced first and second vertical pieces linked by a middle folded spring element therebetween, said first vertical piece secured onto the holder body, distance control means associated said second vertical piece with said first vertical piece so as to enable said second vertical piece to be movable relative to said first vertical piece along a predefined direction within a predetermined distance;
    wherein said distance control means includes at least one first arm extending from said first vertical pieces towards said second vertical piece with a stop attached at a free end thereof, and at least one second arm extending from said second vertical piece to be movable along said at least one first arm.

2. The battery holder as recited in claim 1, wherein projection of said second supporting point on the base wall is located different from that of the board connecting section.

3. The battery holder as recited in claim 1, wherein said negative terminal includes two long spring elements comprising a first long spring element and a second long spring element both extending from said battery engaging section, the first long spring element defining said second supporting point with a free end thereof, the second long spring element integrally connected to the board connecting section.

4. The battery holder as recited in claim 3, wherein said negative terminal includes a pair of said second long spring elements with said free first long spring element therebetween, ends of said second long spring elements integrally connected to the board connecting section.

5. The battery holder as recited in claim 4, wherein said negative terminal includes a pair of said short spring elements positionable at opposite sides of said three long spring elements.

6. The battery holder as recited in claim 1, wherein said short spring element is of a U-shaped configuration with a free end contact area thereof, said short spring element defining said first supporting point at a bottom thereof.

7. The battery holder as claimed in claim 1, wherein the short spring element further having a contact region engaging with the bottom surface of the button battery at a point different from that of the battery engaging section.

8. A battery holder for a button battery having a bottom surface and a side surface thereof, the battery holder comprising:

a holder body having a base wall and a receiving space above the base wall for receiving the button battery, the holder body defining right and left regions around the base wall for receipt of positive and negative terminals, respectively;

the negative terminal having a battery engaging section extending adjacent the right region for engaging the bottom surface of the button battery, a board connecting section on the left region, a spring member extending from said battery engaging section towards the board connecting section such that when the button battery is released from the battery holder, part of the button battery, engaged by said battery engaging section of the negative terminal, is lifted by that spring member;

the positive terminal having opposite spaced first and second vertical pieces linked by a middle folded spring element therebetween, said first vertical piece secured onto the holder body, distance control means associated said second vertical piece with said first vertical piece so as to enable said second vertical piece to be movable relative to said first vertical piece along a predefined direction within a predetermined distance; and wherein said second vertical piece urged to be moved away from the side surface of the button battery towards said first vertical pieces so as to release the button battery from the battery holder;

said distance control means includes at least one first arm extending from said first vertical piece towards said second vertical piece with a stop attached at a free end of said at least one first arm, and at least one second arm extending from said second vertical piece.

9. The battery holder as recited in claim 8, wherein said distance control means includes two said first arms attached to opposite sides of said first vertical piece, and two said second arms attached to said second vertical piece in correspondence with said first arms.

10. The battery holder as recited in claim 8, wherein the spring member includes short and long spring elements, said short spring element having a first supporting point proximate to said battery engaging section and said long spring element having a second supporting point disposed adjacent to said board connecting section, such that when the button battery is released at a first position from the battery holder, said part of the button battery is lifted up by said first and second supporting points bearing against the base wall, and at a second released position, said part is lifted by said second supporting point against the base wall, with said first supporting point spaced away from the base wall.

11. A battery holder comprising:
an insulative housing defining a round receiving cavity;
a contact having a tail section retainably mounted on a peripheral area of the receiving cavity;
a first spring arm extending from the tail section toward the cavity;
a second spring arm and a third spring arm respectively extending backwardly from a distal free end of the first spring arm; wherein
a lowest section of the second spring arm constantly engages a bottom face in the receiving cavity while the lowest section of the third arm provides primary support force when a battery is loaded in the receiving cavity.

12. The battery holder as claimed in claim 11, wherein the first spring arm is the longest one among said spring arms, the second spring arm is longer than the third spring arm.

13. The battery holder as claimed in claim 11, wherein the lowest section of the second spring arm is located at a distal end thereof.

14. The battery holder as claimed in claim 11, wherein the lowest section of the third spring arm is located at a middle portion thereof.

15. The battery holder as claimed in claim 11, wherein the lowest section of the third spring arm is adapted to abut against the bottom face in the receiving cavity when the battery is loaded in the receiving cavity.

* * * * *